United States Patent
Shida et al.

(10) Patent No.: US 10,208,163 B2
(45) Date of Patent: Feb. 19, 2019

(54) METHOD OF PRODUCING POLYIMIDE RESIN, METHOD OF PRODUCING POLYIMIDE COATING, METHOD OF PRODUCING POLYAMIC ACID SOLUTION, POLYIMIDE COATING, AND POLYAMIC ACID SOLUTION

(71) Applicant: Tokyo Ohka Kogyo Co., Ltd., Kawasaki-shi (JP)

(72) Inventors: Masaru Shida, Kawasaki (JP); Teruhiro Uematsu, Kawasaki (JP); Kunihiro Noda, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 170 days.

(21) Appl. No.: 14/624,944

(22) Filed: Feb. 18, 2015

(65) Prior Publication Data
US 2015/0232619 A1    Aug. 20, 2015

(30) Foreign Application Priority Data
Feb. 18, 2014    (JP) ................ 2014-028644

(51) Int. Cl.
| | | |
|---|---|---|
| C08G 73/10 | (2006.01) | |
| C09D 179/08 | (2006.01) | |
| C08G 69/26 | (2006.01) | |
| C08L 79/08 | (2006.01) | |

(52) U.S. Cl.
CPC ......... C08G 73/1007 (2013.01); C08G 69/26 (2013.01); C08G 73/1028 (2013.01); C08G 73/1032 (2013.01); C09D 179/08 (2013.01); C08L 79/08 (2013.01)

(58) Field of Classification Search
CPC ........... C08G 69/26; C08G 73/1028; C08G 73/1032; C08G 73/1046; C09D 179/08; C08L 79/08
USPC ............................................. 524/600
See application file for complete search history.

(56) References Cited

U.S. PATENT DOCUMENTS

| | | | | |
|---|---|---|---|---|
| 3,528,937 A * | 9/1970 | Seddon | .............. | C08G 73/1007 264/154 |
| 3,600,350 A * | 8/1971 | Kwolek | ................ | C08G 69/12 524/211 |
| 3,663,728 A * | 5/1972 | Hoback | ................ | C09D 5/4461 204/493 |
| 4,525,507 A * | 6/1985 | Chaker | .................... | C08J 3/091 524/104 |
| 4,696,994 A * | 9/1987 | Nakajima | .......... | C08G 73/1064 528/125 |
| 5,308,569 A * | 5/1994 | Hamamoto | ............. | B29C 41/24 264/204 |
| 5,508,377 A | 4/1996 | Yamashita et al. | | |
| 6,316,574 B1 * | 11/2001 | Tanioka | ............. | C08G 73/1071 398/9 |
| 2007/0260035 A1 | 11/2007 | Watanabe | | |
| 2009/0075103 A1 | 3/2009 | Kawaguchi et al. | | |
| 2014/0058036 A1 * | 2/2014 | Noda | ...................... | C08L 79/08 524/728 |

FOREIGN PATENT DOCUMENTS

| | | |
|---|---|---|
| JP | H08-081556 A | 3/1996 |
| JP | 2012-021133 | 2/2012 |
| JP | 2014-199446 A | 10/2014 |
| JP | 2014-238564 A | 12/2014 |

OTHER PUBLICATIONS

Extended European Search Report in EP Application No. 15155578. 6, dated May 4, 2015.
Office Action in European Patent Application No. 15155578.6, dated Oct. 28, 2016.
Notification of Reasons for Refusal issued in Japanese Patent Application No. 2014-028644, dated Aug. 22, 2017.

* cited by examiner

*Primary Examiner* — Jane L Stanley
(74) *Attorney, Agent, or Firm* — Knobbe Martens Olson & Bear LLP

(57) ABSTRACT

A method of producing a polyimide resin that produces a polyimide resin having excellent heat resistance and mechanical properties, and having a low dielectric constant even when heat-treated at a lower temperature. The method includes heating at 120° C. to 350° C. a polyamic acid resulting from the reaction of a tetracarboxylic acid dianhydride component and a diamine component in a solvent including at least a compound represented by the general formula (1), in which $R^1$ represents a hydrogen atom or a hydroxyl group, $R^2$ and $R^3$ independently represent a hydrogen atom or a $C_1$ to $C_3$ alkyl group, and $R^4$ and $R^5$ independently represent a $C_1$ to $C_3$ alkyl group.

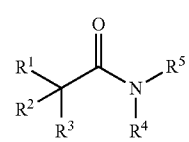

(1)

8 Claims, No Drawings

METHOD OF PRODUCING POLYIMIDE RESIN, METHOD OF PRODUCING POLYIMIDE COATING, METHOD OF PRODUCING POLYAMIC ACID SOLUTION, POLYIMIDE COATING, AND POLYAMIC ACID SOLUTION

RELATED APPLICATION

This application claims priority UNDER 35 U.S.C. § 119(a)-(d) to Japanese Patent Application No. 2014-028644, filed Feb. 18, 2014, the entire content of which is incorporated herein by reference.

BACKGROUND OF THE INVENTION

Field of the Invention

The present invention relates to a method of producing a polyimide resin, a method of producing a polyimide coating, and a method of producing a polyamic acid solution. The present invention further relates to a polyimide coating resulting from the method of producing a polyimide coating. The present invention still further relates to a polyamic acid solution resulting from the method of producing a polyamic acid solution.

Related Art

Polyimide resin is excellent in heat resistance, mechanical strength, and insulation properties and has properties such as a lower dielectric constant and thus has been widely used as an insulating material or a protective material in electric or electronic parts such as various devices and electronic substrates including multilayer wiring substrates.

The polyimide resin is typically formed by heat-treatment at a high temperature of about 300° C. of a polyamic acid obtained by polymerizing a tetracarboxylic acid dianhydride component and a diamine component in a polar organic solvent such as N-methyl-2-pyrrolidone (NMP), and dimethylformamide (DMF).

For this reason, polyimide products used for electronic materials are often supplied as a solution of polyimide precursor like a polyamic acid. When producing electric or electronic parts, the solution of polyimide precursor is supplied to a site where an insulating material or a protective material is to be formed by a process such as coating or injection, then the solution of polyimide precursor is heat-treated at a high temperature of about 300° C. to thereby form the insulating material or the protective material.

In such a conventional method of forming the insulating material or the protective material composed of the polyimide resin from the polyimide precursor, there is a problem in that the method cannot be applied to heat-sensitive materials since heat-treatment at a high temperature is necessary. Although there is also a solution of polyimide precursor allowing formation of a polyimide resin by treating at a lower temperature of around 200° C. for example, when forming the polyimide resin at lower temperatures, there may also be a problem in that heat resistance and/or mechanical properties of the resulting polyimide resin degrade or dielectric constant thereof increases.

For this reason, a method for obtaining the polyimide resin with excellent properties even by heat-treating a polyimide precursor at a lower temperature has been investigated. Specifically, Patent Document 1 discloses in Examples a method of producing a polyimide resin through imidization at 150° C. of a polyamic acid obtained by polymerizing 2,2-bis(3-amino-4-hydroxyphenyl)hexafluoropropane and 3,3',4,4'-diphenylether tetracarboxylic acid dianhydride in propyleneglycol monomethylether acetate, for example.

[Patent Document 1] Japanese Unexamined Patent Application, Publication No. 2012-021133

SUMMARY OF THE INVENTION

However, it has become clear from investigations by the present inventors that polyamic acid in a solution state cannot be obtained by the method of producing a polyimide resin using propyleneglycol monomethylether acetate as a solvent described in Patent Document 1 when a tetracarboxylic acid dianhydride component and a diamine component are combined other than the combination of 2,2-bis(3-amino-4-hydroxyphenyl)hexafluoropropane and 3,3',4,4'-diphenylether tetracarboxylic acid dianhydride and that polyimide resin cannot be obtained as a result thereof.

The present invention has been made in view of the problems described above; and it is an object of the present invention to provide a method of producing a polyimide resin that produces a polyimide resin excellent in heat resistance and mechanical properties and having a low dielectric constant even when heat-treated at a lower temperature; a method of producing a polyimide coating that produces a polyimide coating excellent in heat resistance and mechanical properties and having a low dielectric constant even when heat-treated at a lower temperature; a method of producing a polyamic acid solution that leads to the polyimide resin; a polyimide coating resulting from the method of producing a polyimide resin; and a polyamic acid solution resulting from the method of producing a polyamic acid solution.

The present inventors have found that the problems described above can be solved by using a specific amide-based solvent as a solvent for obtaining a polyamic acid resulting from the reaction of a tetracarboxylic acid dianhydride component and a diamine component, thereby completing the present invention.

A first aspect of the present invention relates to a method of producing a polyimide resin that includes heating at from 120° C. to 350° C. a polyamic acid resulting from the reaction of a tetracarboxylic acid dianhydride component and a diamine component in a solvent comprising at least a compound (A) represented by the general formula (1):

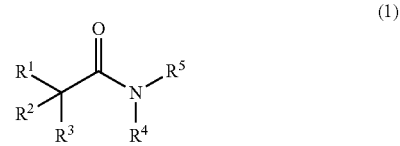

(1)

wherein, $R^1$ represents a hydrogen atom or a hydroxyl group, $R^2$ and $R^3$ independently represent a hydrogen atom or a $C_1$ to $C_3$ alkyl group, and $R^4$ and $R^5$ independently represent a $C_1$ to $C_3$ alkyl group.

A second aspect of the present invention relates to a method of producing a polyimide coating that includes heating at from 120° C. to 350° C. a polyimide precursor coating formed by coating on a base substance a polyamic acid solution resulting from the reaction of a tetracarboxylic acid dianhydride component and a diamine component in a solvent comprising at least the compound (A).

A third aspect of the present invention relates to a polyimide coating produced by the method of producing a polyimide coating according to the second aspect.

A fourth aspect of the present invention relates to a method of producing a polyamic acid solution by the reaction of a tetracarboxylic acid dianhydride component and a diamine component in a solvent comprising at least the compound (A).

A fifth aspect of the present invention relates to a polyamic acid solution produced by the method of producing a polyamic acid solution according to the fourth aspect.

In accordance with the present invention, a method of producing a polyimide resin can be provided that produces a polyimide resin excellent in heat resistance and mechanical properties and having a low dielectric constant even when heat-treated at a lower temperature. In accordance with the present invention, a method of producing a polyimide coating can also be provided that produces a polyimide coating excellent in heat resistance and mechanical properties and having a low dielectric constant even when heat-treated at a lower temperature. Furthermore, in accordance with the present invention, a method of producing a polyamic acid solution can be provided that leads to a polyimide resin excellent in heat resistance and mechanical properties and having a low dielectric constant even when heat-treated at a lower temperature. Additionally, in accordance with the present invention, a polyimide coating produced by the method of producing a polyimide coating and a polyamic acid solution produced by the method of producing a polyamic acid solution can be provided.

DETAILED DESCRIPTION OF THE INVENTION

First Aspect

The first aspect of the present invention is the method of producing a polyimide resin that includes heating at from 120° C. to 350° C. a polyamic acid resulting from the reaction of a tetracarboxylic acid dianhydride component and a diamine component in a solvent comprising at least a compound (A) represented by the general formula (1). Hereinafter, the polyamic acid and the method of yielding the polyimide resin are explained.

<Polyamic Acid>

In the production method of the polyimide resin according to the first aspect, the polyamic acid used for yielding the polyimide resin is not particularly limited and may be appropriately selected from polyamic acids conventionally known as a precursor of the polyimide resin.

Preferable polyamic acids may be exemplified by the polyamic acids composed of the structural units represented by Formula (2) below:

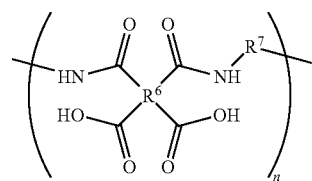

in Formula (2), $R^6$ is a tetravalent organic group; $R^7$ is a bivalent organic group; and n is a number of repeating structural units represented by Formula (2).

In Formula (2), $R^6$ is a tetravalent organic group, $R^7$ is a divalent organic group, and the numbers thereof of carbon atoms are preferably from 2 to 50 and more preferably from 2 to 30. $R^6$ and $R^7$ may be each an aliphatic or aromatic group, or a complex group including these structures. $R^6$ and $R^7$ may include a halogen atom, an oxygen atom, and a sulfur atom in addition to carbon and hydrogen atoms. In cases where $R^6$ and $R^7$ include a halogen atom, an oxygen atom, or a sulfur atom, the halogen atom, the oxygen atom, or the sulfur atom may be included in $R^6$ and $R^7$ as a group selected from a nitrogen-containing heterocyclic group, —CONH—, —NH—, —N=N—, —CH=N—, —COO—, —O—, —CO—, —SO—, —SO$_2$—, —S—, and —S—S—, more preferably, the atom is included in $R^6$ and $R^7$ as a group selected from —O—, —CO—, —SO—, —SO$_2$—, —S—, and —S—S—.

By way of heating the polyamic acids composed of the structural units represented by Formula (2) described above, the polyimide resins composed of the structural units represented by Formula (3) below can be obtained:

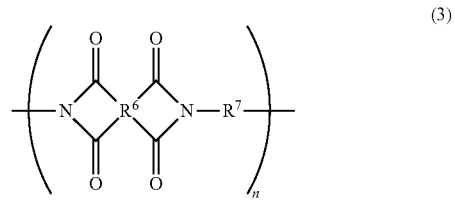

in Formula (3), $R^6$ and $R^7$ are as described in Formula (2); and n is a number of repeating structural units represented by Formula (3).

Hereinafter, the compound (A), the tetracarboxylic acid dianhydride component, and the diamine component used for preparing the polyamic acid and the method of preparing the polyamic acid are explained.

[Compound (A) Represented by General Formula (1)]

In the present invention, the polyamic acid is synthesized by reacting a tetracarboxylic acid dianhydride component and a diamine component in a solvent comprising at least a compound (A) represented by the general formula (1). When yielding the polyamide resin by way of heating the polyamic acid synthesized using the compound (A) as at least one solvent, a polyimide resin good in tensile elongation and heat resistance may be easily obtained.

The compound (A) has a relatively low boiling point among the solvents which can dissolve the tetracarboxylic acid dianhydride component, the diamine component, and the resulting polyamic acid. Therefore, when forming the polyimide resin by use of the polyamic acid synthesized using the compound (A) as at least one solvent, the solvent is less likely to remain in the resulting polyimide resin, and thus the resulting polyimide resin is unlikely to cause an increase in dielectric constant and/or a decrease in tensile elongation etc., even in cases of heating the polyamic acid at lower temperatures.

The compound (A) can be used alone or in combination of two or more.

In the general formula (1), examples of the $C_1$-$C_3$ alkyl group represented by $R^2$ or $R^3$ and the $C_1$-$C_3$ alkyl group represented by $R^4$ or $R^5$ include a methyl group, an ethyl group, a propyl group and an isopropyl group.

$R^2$, $R^3$, $R^4$, and $R^5$ are preferably a methyl group or an ethyl group independently, and, particularly preferably, all are a methyl group.

Specific examples of the compound (A) include compounds represented by each of the following formulas (a-1) to (a-17).

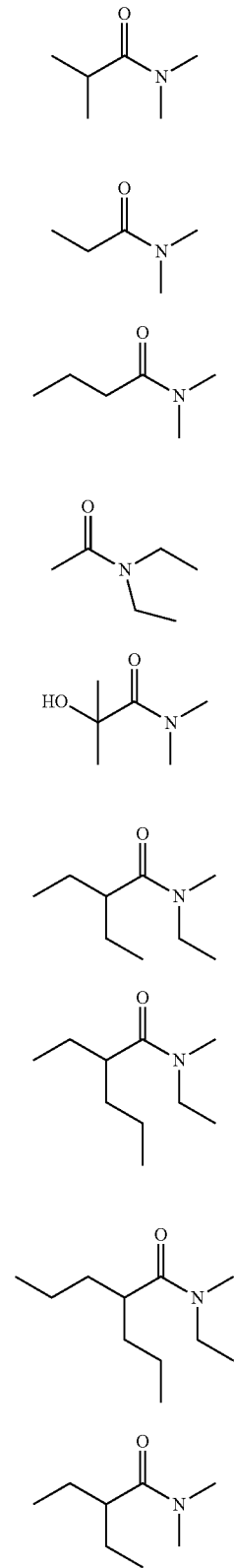

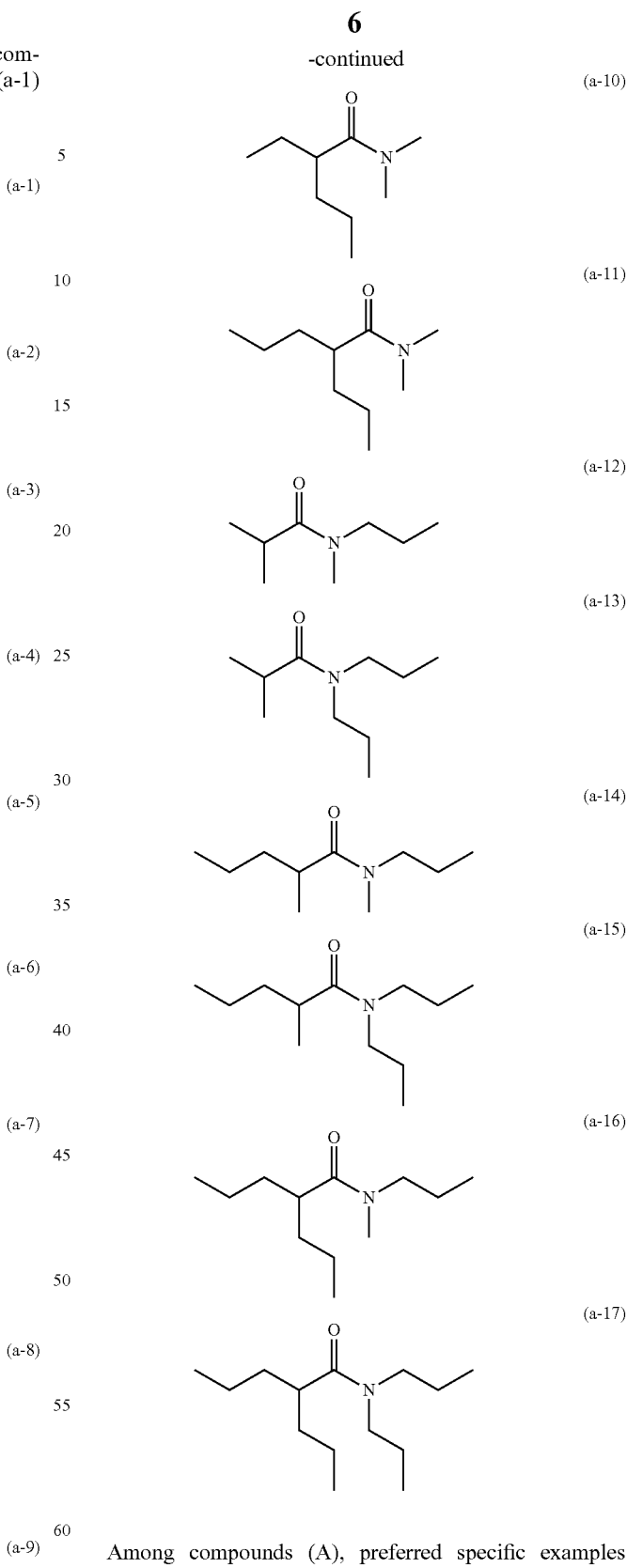

Among compounds (A), preferred specific examples include the compounds represented by each of the formulas (a-1) to (a-4). The compounds represented by the formula (a-1), namely, N,N,2-trimethylpropione amide, is particularly preferred. N,N,2-trimethylpropione amide has a boiling point under atmospheric pressure of about 173° C., which boiling point is especially low among the compounds (A).

Therefore, when forming the polyimide resin by use of the polyamic acid synthesized using N,N,2-trimethylpropione amide as at least one solvent, the solvent is especially less likely to remain in the resulting polyimide resin, and thus the resulting polyimide resin is unlikely to cause an increase in dielectric constant and/or a decrease in tensile elongation etc., even in cases of heating the polyamic acid at lower temperatures. Further, N,N,2-trimethylpropione amide is advantageous because it is not designated as a substance of very high concern (SVHC) in REACH regulation of the European Union (EU); it has a low hazardous property including toxicity; and safety is especially high.

[Tetracarboxylic Acid Dianhydride Component]

The tetracarboxylic acid dianhydride component as a raw material for synthesizing the polyamic acid is not particularly limited as long as the polyamic acid can be formed by the reaction with the diamine component. The tetracarboxylic acid dianhydride component may be appropriately selected from conventional tetracarboxylic acid dianhydrides used heretofore as a raw material for synthesizing the polyamic acid. The tetracarboxylic acid dianhydride component may be an aromatic tetracarboxylic acid dianhydride or an aliphatic tetracarboxylic acid dianhydride. The aromatic tetracarboxylic acid dianhydride is preferred from the viewpoint of heat resistance of the resulting polyimide resin. The tetracarboxylic acid dianhydride component used may be a combination of two or more compounds.

Specific examples of preferable aromatic tetracarboxylic acid dianhydride are pyromellitic acid dianhydride, 3,3',4,4'-biphenyl tetracarboxylic acid dianhydride, 2,3,3',4'-biphenyl tetracarboxylic acid dianhydride, 3,3',4,4'-benzophenone tetracarboxylic acid dianhydride, 4,4'-oxydiphthalic acid anhydride, and 3,3',4,4'-diphenylsulfone tetracarboxylic acid dianhydride, etc. Among these, 3,3',4,4'-biphenyl tetracarboxylic acid dianhydride and pyromellitic acid dianhydride are preferred from the viewpoint of price, availability, etc.

Incidentally, a combined use of tetracarboxylic acid dianhydride and dicaroboxylic acid anhydride is possible. Upon using these carboxylic acid anhydrides in combination, the properties of obtained polyimide resins sometimes become better. Examples of the dicarboxylic acid anhydrides are maleic anhydride, succinic anhydride, itaconic anhydride, phthalic anhydride, tetrahydrophthalic anhydride, hexahydrophthalic anhydride, methyl endo-methylene-tetrahydrophthalic anhydride, chlorendic anhydride, methyltetrahydrophthalic anhydride, glutaric anhydride, and cis-4-cyclohexene-1,2-dicarboxylic anhydride.

[Diamine Component]

The diamine component as a raw material for synthesizing the polyamic acid is not particularly limited as long as the polyamic acid can be formed by the reaction with the tetracarboxylic acid dianhydride component. The diamine component may be appropriately selected from conventional diamines used heretofore as a raw material for synthesizing the polyamic acid. The diamine component may be an aromatic diamine or an aliphatic diamine. The aromatic diamine is preferred from the viewpoint of heat resistance of the resulting polyimide resin. The diamine component used may be a combination of two or more compounds.

Specific examples of preferable aromatic diamine are p-phenylenediamine, m-phenylenediamine, 2,4-diaminotoluene, 4,4'-diaminobiphenyl, 4,4'-diamino-2,2'-bis(trifluoromethyl)biphenyl, 3,3'-diaminodiphenylsulfone, 4,4'-diaminodiphenylsulfone, 4,4'-diaminodiphenylsulfide, 4,4'-diaminodiphenylmethane, 4,4'-diaminodiphenylether, 3,4'-diaminodiphenylether, 3,3'-diaminodiphenylether, 1,4-bis (4-aminophenoxy)benzene, 1,3-bis(4-aminophenoxy)benzene, 1,3-bis(3-aminophenoxy)benzene, 4,4'-bis(4-aminophenoxy)biphenyl, bis[4-(4-aminophenoxy)phenyl]sulfone, bis[4-(3-aminophenoxy)phenyl]sulfone, 2,2-bis[4-(4-aminophenoxy)phenyl]propane, 2,2-bis[4-(4-aminophenoxy)phenyl]hexafluoropropane, 9,9-bis(4-aminophenyl)fluorene, 9,9-bis(4-amino-3-methylphenyl) fluorene, and 4,4'-[1,4-phenylenebis(1-methylethane-1,1-diyl)]dianiline, etc. Among these, p-phenylenediamine, m-phenylenediamine, 2,4-diaminotoluene, and 4,4'-diaminodiphenylether are preferred from the viewpoint of price, availability, etc.

[Synthesis of Polyamic Acid]

The polyamic acid is synthesized by the reaction of the tetracarboxylic acid dianhydride component and the diamine component using the compound (A) as at least one of solvents as described above. The amounts of the tetracarboxylic acid dianhydride component and the diamine component used for synthesizing the polyamic acid are not particularly limited. The diamine component is preferably used in an amount of from 0.50 to 1.50 moles, more preferably from 0.60 to 1.30 moles, and particularly preferably from 0.70 to 1.20 moles based on 1 mole of the tetracarboxylic acid dianhydride component.

The amount of the compound (A) used is not particularly limited within a range not inhibiting the purpose of the present invention. Typically, the amount of the compound (A) used is preferably from 20 to 2000 parts by mass, more preferably from 100 to 1500 parts by mass, and even more preferably from 150 to 1000 parts by mass based on 100 parts by mass of total amount of the tetracarboxylic acid dianhydride component and the diamine component.

Most preferably, only the compound (A) is used as the solvent when synthesizing the polyamic acid. However, a solvent other than the compound (A) may be used together with the compound (A) within a range not inhibiting the purpose of the present invention. The solvent other than the compound (A) may be appropriately selected from conventional solvents used heretofore as a solvent for synthesizing the polyamic acid. Preferable examples of the solvent other than the compound (A) are N-methyl-2-pyrrolidone, N,N-dimethylformamide, hexamethylphosphoramide, 1,3-dimethyl-2-imidazolidinone, etc. When using the solvent other than the compound (A) together with the compound (A), the amount of the other solvent used is preferably no greater than 20% by mass based on the total mass of the solvents used for synthesizing the polyamic acid, more preferably no greater than 10% by mass, and particularly preferably no greater than 5% by mass.

The temperature when reacting the tetracarboxylic acid dianhydride component and the diamine component is not particularly limited as long as the reaction proceeds properly. Typically, the reaction temperature between the tetracarboxylic acid dianhydride component and the diamine component is preferably from −5° C. to 150° C., more preferably from 0° C. to 120° C., and particularly preferably from 0° C. to 70° C. Typically, the period for reacting the tetracarboxylic acid dianhydride component and the diamine component, which depends on the reaction temperature, is preferably from 1 to 50 hours, more preferably from 2 to 40 hours, and particularly preferably from 5 to 30 hours.

The polyamic acid solution can be obtained by the methods explained above. In a case of yielding a polyimide resin, the polyamic acid solution may be directly used, alternatively, a paste or a solid of the polyamic acid resulting from removing at least a part of the solvent from the polyamic acid solution under a reduced pressure at a lower temperature not causing conversion of the polyamic acid to polyimide resin may also be used. A polyamic acid solution, where its solid content concentration has been adjusted by adding an appropriate amount of a solvent comprising at least the compound (A) to the polyamic acid solution resulting from the reaction described above, may also be used for preparing the polyimide resin.

The polyamic acid solution may comprise a cure accelerator component. As the cure accelerator component, for instance, imidazole, benzimidazole, and 4-hydroxypyridine can be suitably used, but the cure accelerator is not limited thereto and may be selected from conventionally known compounds appropriately. The effects of the present invention may be further improved by the polyamic acid solution containing a cure accelerator. For instance, a polyimide film having good heat resistance may be obtained even by heat treatments at lower temperatures. The cure accelerator is used in an amount of 0.1 molar equivalent or more, preferably 0.2 to 4.0 molar equivalents, the most preferably 0.5 to 2.5 molar equivalents, per molar equivalent of the repeating unit of the polyamic acid. If the added amount of the cure accelerator is lower than the upper limit, storage stability of the polyimide precursor solution is less likely to be worse; and after heat curing, a residue amount of the cure accelerator component is less likely to increase and various properties are less likely to be adversely affected.

<Method of Yielding Polyimide Resin>

The polyamic acid obtained as described above is heated to thereby yield a polyimide resin. In this stage, the polyamic acid is heated at preferably from 120° C. to 350° C. and more preferably from 150° C. to 350° C. By way of heating the polyamic acid at a temperature within this range, the polyimide resin can be yielded while suppressing thermal degradation or decomposition of the yielding polyimide resin.

In cases where the heating of the polyamic acid is performed at high temperatures, time degradation of treatment facilities may be promoted at the high temperatures; therefore, it may also be preferred to perform the heating of the polyamic acid at a lower temperature. Specifically, upper limit of the temperature of heating the polyamic acid is set to preferably no higher than 250° C., more preferably no higher than 220° C., and particularly preferably no higher than 200° C.

In accordance with the production method of the polyimide resin according to the first aspect explained above, the polyimide resin excellent in heat resistance and mechanical properties such as tensile elongation and having a low dielectric constant can be obtained even in cases where the polyimide resin is yielded by heating the polyamic acid at a temperature as low as no higher than 200° C.

Second Aspect

The second aspect of the present invention is the method of producing a polyimide coating that includes heating at from 120° C. to 350° C. a polyimide precursor coating formed by coating on a base substance the polyamic acid solution resulting from the reaction of the tetracarboxylic acid dianhydride component and the diamine component in a solvent comprising at least a compound (A) represented by the general formula (1).

In the production method of the polyimide coating according to the second aspect of the present invention, materials for producing the polyamic acid solution, production methods of the polyamic acid solution, and heating conditions for converting the polyamic acid into the polyimide resin are similar to those of the production method of the polyimide resin according to the first aspect.

Materials of the base substance used for forming the polyimide coating are not particularly limited as long as thermal degradation or deformation does not occur when heating the polyamic acid solution coated on the base substance. Shape of the base substance is also not particularly limited as long as the polyamic acid solution can be coated. Examples of the base substance are electronic devices such as semiconductor devices on which electrodes and/or wirings to be insulated have been formed, interim products such as multilayer wiring substrates, and other various substrates. In cases where the base substance is a substrate, preferable material of the substrate may be exemplified by glasses; silicon; aluminum (Al); aluminum alloys such as aluminum-silicon (Al—Si), aluminum-copper (Al—Cu), and aluminum-silicon-copper (Al—Si—Cu); titanium (Ti); titanium alloys such as titanium-tungsten (Ti—W); titanium nitride (TiN); tantalum (Ta); tantalum nitride (TaN); tungsten (W); tungsten nitride (WN); and copper.

A polyimide coating is formed on a base substance using electronic devices such as semiconductor devices or multilayer wiring substrates as a base substance, thereby an insulating coating composed of the polyimide resin can be formed on the electronic devices or multilayer wiring substrates. A polyimide coating is formed using a plate-like substrate as a base substance, thereby a polyimide film can be obtained. The polyimide film formed on the substrate may be used on the substrate without change or in a state peeled from the substrate.

The method of coating the polyamic acid solution on the base substance is not particularly limited. Examples of the method of coating the polyamic acid solution on the base substance are spin coating processes, spray processes, roller coating processes, dipping processes, etc. The coating thickness of coated film of the polyamic acid solution formed on the base substance, which is not particularly limited, is preferably from 0.8 to 350 μm and more preferably from 1.3 to 85 μm. When the polyamic acid solution is coated within this range of coating thickness, a polyimide coating with desired properties may be easily obtained.

The coating thickness of the polyimide coating produced by the production method according to the second aspect of the present invention, which is not particularly limited, is preferably from 0.5 to 200 μm and more preferably from 0.8 to 50 μm. The coating thickness of the polyimide coating can be controlled by adjusting a solid content concentration of the polyamic acid solution and/or the coating thickness of coated film composed of the polyamic acid solution.

In accordance with the production method according to the second aspect of the present invention, the polyimide coating excellent in heat resistance and mechanical properties such as tensile elongation and having a low dielectric constant can be obtained.

Third Aspect

The third aspect of the present invention is the polyimide coating formed by the method of producing a polyimide coating according to the second aspect. Since the polyimide coating according to the third aspect is produced by the method of producing a polyimide coating according to the second aspect, the heat resistance and mechanical properties such as tensile elongation are excellent and the dielectric constant is lower.

In cases of solutions of polyamic acid resins obtained using a solvent other than the compound (A), it is necessary to heat the coated films of polyamic acid solutions to a somewhat high temperature in order to form a polyimide coating. In this case, thermal imidization reaction of an amide progresses whereas thermal decomposition reaction of an amide occurs; consequently, a polyimide coating rich in polyimide resin with lower molecular masses is formed. Therefore, a polyimide coating excellent in tensile elongation is difficult to be obtained if the polyimide coating is formed using a polyamic acid solution obtained using a solvent other than the compound (A).

On the other hand, since the polyimide coating according to the third aspect is formed by heating at from 120° C. to 350° C. the polyamic acid solution obtained using the compound (A), it is therefore believed that formation of the polyimide resin with lower molecular masses is suppressed when forming the polyimide coating and thus the tensile elongation is excellent.

Fourth Aspect

The fourth aspect of the present invention is the method of producing a polyamic acid solution by the reaction of a tetracarboxylic acid dianhydride component and a diamine component in a solvent comprising at least a compound (A) represented by the general formula (1). The production method of the polyamic acid solution according to the fourth aspect is similar to the production method of the polyamic acid solution explained with respect to the first aspect.

In accordance with the production method of the polyamic acid solution according to the fourth aspect, the polyamic acid solution leading to the polyimide resin excellent in heat resistance and mechanical properties such as tensile elongation and having a low dielectric constant can be obtained even in cases of baking at a lower temperature like about 180° C. for example by use of the compound (A) as at least one of reaction solvents.

Fifth Aspect

The fifth aspect of the present invention is the polyamic acid solution resulting from the method of producing a polyamic acid solution according to the fourth aspect. In accordance with the polyamic acid solution according to the fifth aspect, the polyimide resin excellent in heat resistance and mechanical properties such as tensile elongation and having a low dielectric constant can be obtained even in cases of baking at a lower temperature, for example, at about 180° C.

EXAMPLES

Hereinafter, the present invention is explained specifically with reference to examples, but the present invention is not limited to these examples.

Examples 1 to 19 and Comparative Examples 1 to 13

In Examples and Comparative Examples, TC1 to TC3 shown below were used as tetracarboxylic acid dianhydride components. In Examples and Comparative Examples, DA1 to DA4 shown below were used as diamine components.

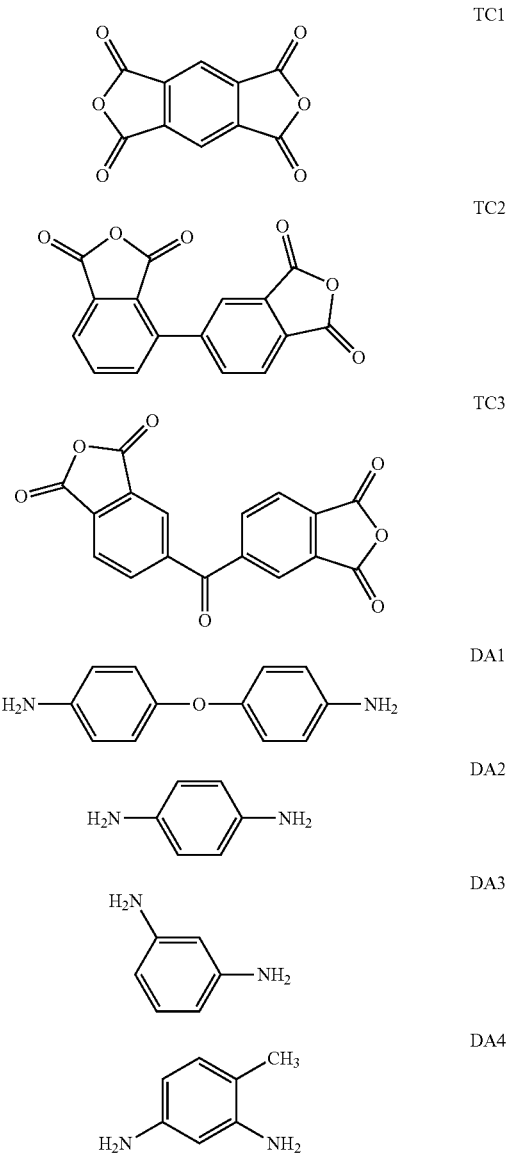

In Examples, N,N,2-trimethylpropione amide (DMIB) or N,N-dimethylacetamide (DMAc) shown below was used as a solvent when preparing polyamic acid solutions. In Comparative Examples, S1 to S12 shown below were used as solvents when preparing polyamic acid solutions.

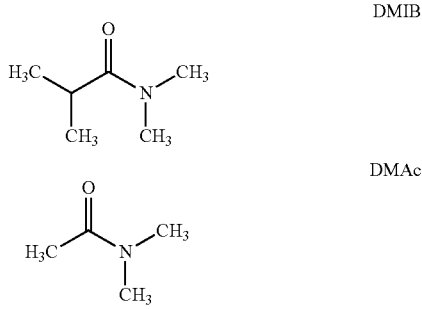

S1 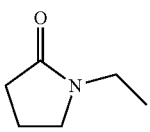

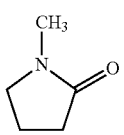

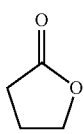

S3

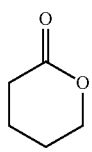

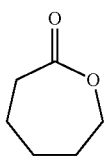

S5

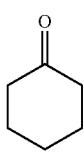

S6

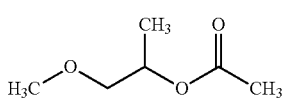

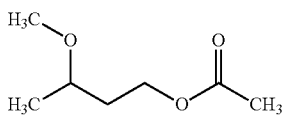

S9 

S10

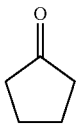

S11 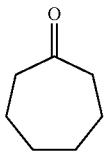

S12 

[Preparation of Polyamic Acid Solution]

In accordance with the conventional method, tetracarboxylic acid dianhydrides, diamines, and solvents in the types and amounts respectively described in Table 1 were poured into a separable flask of volume 5 L equipped with a stirrer, a stirring blade, a reflux cooler, and a nitrogen gas-introducing tube. The atmosphere in the flask was exchanged with nitrogen by introducing nitrogen from the nitrogen gas-introducing tube. Then, the tetracarboxylic acid dianhydrides and the diamines were allowed to react at the temperature and periods described in Table 1 while stirring the contents in the flask to thereby obtain polyamic acid solutions. In this regard, in Comparative Examples 6 to 12, no polyamic acid solution could be obtained since the reaction between the tetracarboxylic acid dianhydrides and the diamines did not proceed appropriately under a solution state. Here, in Example 13, 0.6 mole of water was added to the raw material for preparing the polyamic acid.

In Example 14, the total amount of N,N,2-trimethylpropione amide was added into the flask when starting the reaction. Additionally, in Example 14, the total amount of the tetracarboxylic acid dianhydride component and the diamine component was divided into two halves, and the two one-halves of the total amount were individually added into the flask, one half when starting the reaction and the other half after 15 hours from starting the reaction to allow the reaction for 30 hours in total, thereby obtaining the polyamic acid solution.

In Example 15, the total amounts of N,N,2-trimethylpropione amide and the diamine component were added into the flask when starting the reaction. Additionally, in Example 15, the total amount of the tetracarboxylic acid dianhydride component was divided into two halves, and the two one-halves of the total amount were individually added into the flask, one half when starting the reaction and the other half after 15 hours from starting the reaction to allow the reaction for 30 hours in total, thereby obtaining the polyamic acid solution.

In Example 16, the entire amounts of N,N,2-trimethylpropione amide and the tetracarboxylic acid dianhydride component were added into the flask when starting the reaction. Additionally, in Example 16, the total amount of the diamine component was divided into two halves, and the two one-halves of the total amount were individually added into the flask, one half when starting the reaction and the other half after 15 hours from starting the reaction to allow the reaction for 30 hours in total, thereby obtaining the polyamic acid solution.

In regards to Examples 1 to 3 and 18 and Comparative Example 2, number average molecular masses (Mn), mass average molecular masses (Mw), and molecular mass dispersivities (Mw/Mn) of polyamic acids in the resulting polyamic acid solutions were measured by gel permeation chromatography. The measurement results are shown in Table 2.

[Preparation of Polyimide Coating]

Polyimide coatings were formed using the resulting polyamic acids, and heat resistance, dielectric constants, and tensile elongations of the polyimide coatings were evaluated in accordance with the methods below.

(Evaluation of Heat Resistance)

Imidazole was added to the resulting polyamic acid solutions in a ratio of 1.5 molar equivalents per molar equivalent of the repeating unit of the polyamic acid and then stirred and dissolved. The polyamic acid solutions in which imidazole is dissolved were coated on wafer substrates by a spin coater (1H-360S, by Mikasa Co.). The coated films on the wafer substrates were heated for 20 minutes at the baking temperatures described in Table 1 to thereby form polyimide coatings with coating thicknesses of about 0.9 μm. A sample of 5 μg for evaluating the heat resistance was shaved off from each of the resulting polyimide coatings. TG curves were obtained using the samples of the polyimide resins for evaluating the heat resistance by measuring with a thermogravimetry/differential thermal analyzer (TG/DTA-6200, by Seiko Instruments Inc.).

5% weight reduction temperatures of the samples were measured from the resulting TG curves. A case where the 5% weight reduction temperature is no lower than 300° C. was determined to be good (A) and a case where it is lower than 300° C. was determined to be bad (B). The evaluation results of the heat resistance are shown in Table 1.

(Evaluation of Dielectric Constant)

The resulting polyamic acid solutions were coated on wafer substrates by the spin coater (1H-360S, by Mikasa Co.). The coated films on the wafer substrates were heated for 20 minutes at the baking temperatures described in Table 1 to thereby form polyimide coatings with coating thicknesses of about 0.9 μm. Relative dielectric constants of the polyimide resins were measured using the resulting polyimide coatings as the samples under a condition of frequency 0.1 MHz by a dielectric constant meter (SSM-495, by SEMILAB JAPAN K.K.). A case where the relative dielectric constant is no greater than 4.2 was determined to be good (A) and a case where it is greater than 4.2 was determined to be bad (B). The evaluation results of the dielectric constant are shown in Table 1.

(Tensile Elongation)

The resulting polyamic acid solutions were coated on wafer substrates by an applicator (Model TBA-7, by YOSHIMITSU SEIKI Co.). The coated films on the wafer substrates were heated for 20 minutes at the baking temperatures described in Table 1 to thereby form polyimide coatings with coating thicknesses of about 10 μm. Dumbbell-type test pieces with a shape in accordance with IEC450 standard were punched out from the resulting polyimide coatings to thereby obtain test pieces for measuring the tensile elongation. Fracture elongations of the polyimide resins were measured using the resulting test pieces under a condition of chuck-chuck distance 20 mm and tension rate 2 mm/min by a universal testing machine (TENSILON, by Orientec Co.). A case where the fracture elongation is no less than 25% was determined to be extremely good (A), a case where the fracture elongation is no less than 20% and less than 25% was determined to be good (B), and a case where it is less than 20% was determined to be bad (C). The evaluation results of the fracture elongations are shown in Table 1.

TABLE 1

| | Components in polyamic acid solution | | | | | Evaluation of polyimide resin | | |
|---|---|---|---|---|---|---|---|---|
| | Tetracarboxylic acid anhydride (Type/mol/g) | Diamine (Type/mol/g) | Solvent (Type/mol/g) | Reaction condition (° C./hr) | Baking temp. (° C.) | Heat resistance | Dielectric constant | Tensile elongation |
| Ex. | | | | | | | | |
| 1 | TC1/3/654.4 | DA1/3.36/672.8 | DMIB/25.4/2925.3 | 50/20 | 180 | A | A | A |
| 2 | TC1/3/654.4 | DA1/3.36/672.8 | DMIB/25.4/2925.3 | 50/10 | 180 | A | A | A |
| 3 | TC1/3/654.4 | DA1/3.36/672.8 | DMIB/25.4/2925.3 | 50/30 | 180 | A | A | A |
| 4 | TC1/1.5/327.2 | DA1/1.68/336.4 | DMIB/25.4/2925.3 | 50/20 | 180 | A | A | A |
| 5 | TC1/3/654.4 | DA1/2.24/448.5 | DMIB/25.4/2925.3 | 50/20 | 180 | A | A | A |
| 6 | TC1/3/654.4 | DA1/3.6/720.9 | DMIB/25.4/2925.3 | 50/20 | 180 | A | A | A |
| 7 | TC3/3/966.7 | DA1/3.36/672.8 | DMIB/25.4/2925.3 | 50/20 | 180 | A | A | A |
| 8 | TC2/3/882.7 | DA1/3.36/672.8 | DMIB/25.4/2925.3 | 50/20 | 180 | A | A | A |
| 9 | TC2/1.5/441.3 TC3/1.5/483.3 | DA1/3.36/672.8 | DMIB/25.4/2925.3 | 50/20 | 180 | A | A | A |
| 10 | TC1/3/654.4 | DA2/3.36/363.4 | DMIB/25.4/2925.3 | 50/20 | 180 | A | A | A |
| 11 | TC1/3/654.4 | DA3/3.36/363.4 | DMIB/25.4/2925.3 | 50/20 | 180 | A | A | A |
| 12 | TC1/3/654.4 | DA4/3.36/410.5 | DMIB/25.4/2925.3 | 50/20 | 180 | A | A | A |
| 13 | TC1/3/654.4 | DA1/3.36/672.8 | DMIB/25.4/2925.3 | 50/20 | 180 | A | A | A |
| 14 | TC1/3/654.4 | DA1/3.36/672.8 | DMIB/25.4/2925.3 | 50/30 | 180 | A | A | A |
| 15 | TC1/3/654.4 | DA1/3.36/672.8 | DMIB/25.4/2925.3 | 50/30 | 180 | A | A | A |
| 16 | TC1/3/654.4 | DA1/3.36/672.8 | DMIB/25.4/2925.3 | 50/30 | 180 | A | A | A |
| 17 | TC1/3/654.4 | DA1/3.36/672.8 | DMIB/25.4/2925.3 | 50/20 | 300 | A | A | A |
| 18 | TC1/3/654.4 | DA1/3.36/672.8 | DMAc/25.4/2213 | 50/20 | 180 | A | A | B |
| 19 | TC1/3/654.4 | DA1/3.36/672.8 | DMAc/25.4/2213 | 50/20 | 300 | A | A | B |
| Comp. Ex. | | | | | | | | |
| 1 | TC1/3/654.4 | DA1/3.36/672.8 | S1/25.4/2874.3 | 50/20 | 180 | A | B | C |
| 2 | TC1/3/654.4 | DA1/3.36/672.8 | S2/25.4/2518 | 50/20 | 180 | A | B | C |
| 3 | TC1/3/654.4 | DA1/3.36/672.8 | S3/25.4/2187 | 50/20 | 180 | A | B | C |
| 4 | TC1/3/654.4 | DA1/3.36/672.8 | S4/25.4/2543 | 50/20 | 180 | A | B | C |
| 5 | TC1/3/654.4 | DA1/3.36/672.8 | S5/25.4/2899 | 50/20 | 180 | A | B | C |
| 6 | TC1/3/654.4 | DA1/3.36/672.8 | S6/25.4/2493 | 50/20 | 180 | — | — | — |
| 7 | TC1/3/654.4 | DA1/3.36/672.8 | S7/25.4/3357 | 50/20 | 180 | — | — | — |
| 8 | TC1/3/654.4 | DA1/3.36/672.8 | S8/25.4/3713 | 50/20 | 180 | — | — | — |
| 9 | TC1/3/654.4 | DA1/3.36/672.8 | S9/25.4/1832 | 50/20 | 180 | — | — | — |
| 10 | TC1/3/654.4 | DA1/3.36/672.8 | S10/25.4/2137 | 50/20 | 180 | — | — | — |

TABLE 1-continued

| | Components in polyamic acid solution | | | | | Evaluation of polyimide resin | | |
|---|---|---|---|---|---|---|---|---|
| | Tetracarboxylic acid anhydride (Type/mol/g) | Diamine (Type/mol/g) | Solvent (Type/mol/g) | Reaction condition (° C./hr) | Baking temp. (° C.) | Heat resistance | Dielectric constant | Tensile elongation |
| 11 | TC1/3/654.4 | DA1/3.36/672.8 | S11/25.4/2849 | 50/20 | 180 | — | — | — |
| 12 | TC1/3/654.4 | DA1/3.36/672.8 | S12/25.4/2188 | 50/20 | 180 | — | — | — |
| 13 | TC1/3/654.4 | DA1/3.36/672.8 | S1/25.4/2874.3 | 50/20 | 300 | A | A | C |

TABLE 2

| | Mn | Mw | Mw/Mn |
|---|---|---|---|
| Example 1 | 31500 | 85000 | 2.7 |
| Example 2 | 32300 | 58000 | 3.1 |
| Example 3 | 32500 | 99000 | 2.8 |
| Example 18 | 30000 | 87000 | 2.9 |
| Comparative example 2 | 28900 | 86600 | 3.0 |

It is understood from Examples 1 to 19 that when a polyimide resin is obtained by heating the polyamic acid resulting from the reaction of a tetracarboxylic acid dianhydride component and a diamine component in N,N,2-trimethylpropione amide or N,N-dimethylacetamide, the polyimide resin excellent in heat resistance and tensile elongation and having a low dielectric constant can be obtained through heating at about from 180° C. to 300° C.

It is understood from Comparative Examples 1 to 5 that when a polyamic acid is synthesized using S1 or S2 which is a nitrogen-containing aprotic polar organic solvent or a lactone solvent such as S3 to S5, although a polyamic acid solution may be obtained, the polyimide resin excellent in heat resistance and tensile elongation and having a low dielectric constant cannot be obtained even by heating the resulting polyamic acid at a lower temperature of about 180° C.

It is understood from Comparative Examples 6 to 12 that when a polyamic acid is synthesized using an alicyclic ketone solvent such as S6, S10 and S11, glycol ether acetate such as S7 and S8, or a cyclic ether solvent such as S9 and S12, no polyamic acid solution can be obtained.

It is understood from Examples 17 and 19 that when a polyimide coating is obtained by heating the polyamic acid resulting from the reaction of a tetracarboxylic acid dianhydride component and a diamine component in N,N,2-trimethylpropione amide or N,N-dimethylacetamide, the polyimide coating excellent in tensile elongation can be obtained by heating the polyamic acid at 300° C.

On the other hand, in Comparative Example 13 where a polyimide coating was obtained using a solution of a polyamic acid resulting from the reaction of a tetracarboxylic acid dianhydride component and a diamine component in S1 which is a nitrogen-containing aprotic polar organic solvent, when the polyamic acid was heated at 300° C., only a polyimide coating with poor tensile elongation could be obtained.

It is believed that molecular mass of the polyamic acid was reduced due to cleavage of amide bond during heating thereof in Comparative Example 13 whereas reduction of molecular mass of the polyamic acid was suppressed in Examples 17 and 19. Once molecular mass of the polyamic acid has been reduced, the content of polyimide with lower molecular masses increases in the resulting polyimide coating and thus the tensile elongation of the polyimide coating also decreases.

It is understood from Tables 1 and 2 that, in Examples 1 and 18 and Comparative Example 2, properties of the resulting polyimide coatings are different although molecular masses and molecular mass dispersivities of polyamic acids in the polyamic acid solutions are almost equivalent. The difference between Examples 1 and 18 and Comparative Example 2 is only the types of solvents used for preparing the polyamic acid solutions. It is therefore understood that the use of N,N,2-trimethylpropione amide or N,N-dimethylacetamide in preparing the polyamic acid solution advantageously affects the properties of the polyimide coating, in particular tensile elongation thereof.

What is claimed is:

1. A method of producing a polyimide resin, comprising obtaining a polyimide resin by heating at 180° C. a polyamic acid resulting from the reaction of a tetracarboxylic acid dianhydride component and a diamine component in a solvent comprising N,N,2-trimethylpropione amide;
   wherein the tetracarboxylic acid dianhydride component is at least one selected from the group consisting of pyromellitic acid dianhydride, 2,3,3',4'-biphenyl tetracarboxylic acid dianhydride, and 3,3',4,4'-benzophenone tetracarboxylic acid dianhydride;
   wherein the diamine component is at least one selected from the group consisting of p-phenylenediamine, m-phenylenediamine, 2,4-diaminotoluene, and 4,4'-diaminodiphenylether;
   wherein the molar ratio of the diamine component to the tetracarboxylic acid component is 0.6 to 1.3; and
   wherein the molar ratio of the solvent to the diamine and the tetracarboxylic acid dianhydride components is 3.8 to 8.0.

2. A method of producing a polyimide coating, comprising producing a polyimide resin according to claim 1, wherein the polyamic acid is coated on a base substance prior to heating.

3. The method of producing a polyimide coating according to claim 2, wherein the amount of the N,N,2-trimethyl propione amide is from 20 to 2000 parts by mass based on 100 parts by mass of total amount of the tetracarboxylic acid dianhydride component and the diamine component.

4. The method of producing a polyimide coating according to claim 2, wherein the polyimide coating has a fracture elongation of no less than 25%.

5. The method of producing a polyimide resin according to claim 1, wherein the polyimide resin has a fracture elongation of no less than 25%.

6. The method of producing a polyimide resin according to claim 1, wherein the polyimide resin has a 5% weight reduction temperature measured from TG curve of no lower than 300° C.

7. The method of producing a polyimide resin according to claim 1, wherein the polyimide resin has a relative dielectric constant of no greater than 4.2.

8. The method of producing a polyimide resin according to claim 1, wherein the molar ratio of diamine component to tetracarboxylic acid dianhydride component is 0.7 to 1.2.

* * * * *